United States Patent [19]
Horiuchi

[11] Patent Number: 5,808,651
[45] Date of Patent: Sep. 15, 1998

[54] LINE WIDTH CONTROLLING METHOD

[75] Inventor: Tatsumi Horiuchi, Hachioji, Japan

[73] Assignee: Konica Corporation, Tokyo, Japan

[21] Appl. No.: 613,003

[22] Filed: Mar. 8, 1996

[30] Foreign Application Priority Data

Mar. 16, 1995 [JP] Japan .................................. 7-057323

[51] Int. Cl.⁶ .............................. B41J 2/385; B41J 2/47; G01D 15/14
[52] U.S. Cl. .......................... 347/131; 347/240; 347/140; 399/46
[58] Field of Search ................................... 347/130, 140, 347/124, 188, 133, 131, 240, 251, 259, 252; 358/300; 399/30, 46

[56] References Cited

U.S. PATENT DOCUMENTS 3,937,430  2/1976  Engle .................................. 346/182 B
5,493,321  2/1996  Zwadlo .................................. 347/131

*Primary Examiner*—N. Le
*Assistant Examiner*—Raquel Yvette Gordon
*Attorney, Agent, or Firm*—Frishauf, Holtz, Goodman, Langer & Chick

[57] ABSTRACT

A line width controlling method for controlling a line width of a toner image includes adjusting pulse width signals for controlling light beam emission of a laser beam generator; forming a latent patch image, comprised of plural latent line images, on a photoreceptor by irradiating a light beam from the laser beam generator; and developing the latent patch image with toner so as to form a toner patch image comprised of toner line images. The steps of forming the latent patch image and of developing the latent patch image to form the toner patch image are both repeated for a plurality of times. The toner patch image at each time of forming has a different gradation from that at other times of forming, so that a series of toner patch images is formed on the photoreceptor. The optical densities of the series of toner patch images are measured so as to obtain a variation curve of the measured optical densities, and an inflection point in the variation curve of the measured optical densities is detected, using index signals for controlling the laser beam generator. The line width of the toner image is adjusted according to data of the detected inflection point.

10 Claims, 9 Drawing Sheets

→ ROTATION DIRECTION

→ ROTATION DIRECTION

FIG. 12 (a) PRIOR ART
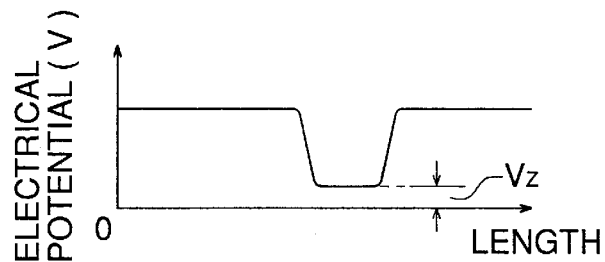
FIG. 12 (b) PRIOR ART
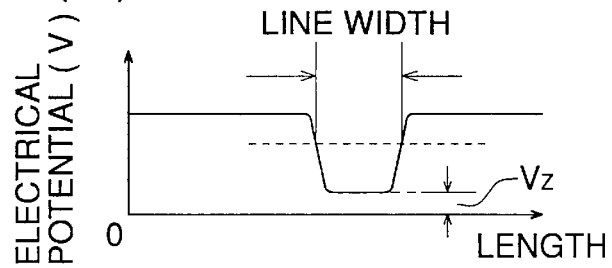
FIG. 12 (c) PRIOR ART
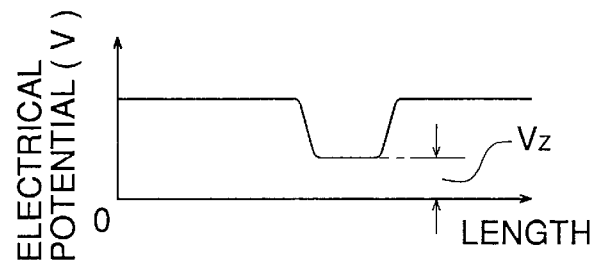
FIG. 12 (d) PRIOR ART
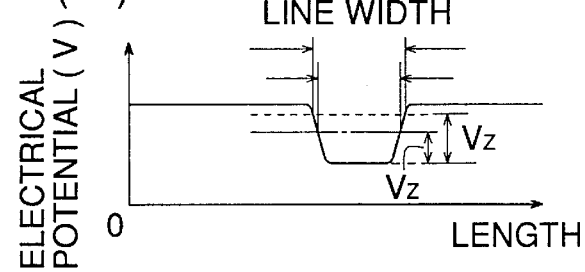
FIG. 12 (e) PRIOR ART
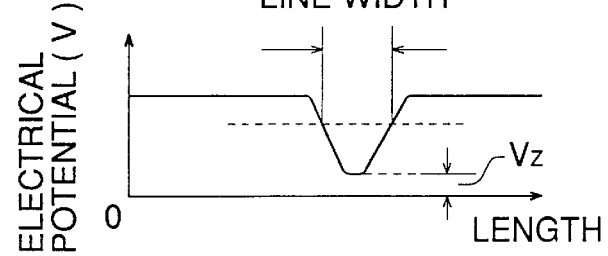

LINE WIDTH CONTROLLING METHOD

BACKGROUND OF THE INVENTION

The present invention relates to a line width controlling method wherein a line width of a line image reproduced through an electrophotographic process is adjusted to a predetermined width.

In an image forming apparatus employing an electrophotographic process, reproduced line images change image density and line widths depending on environmental conditions such as temperature and humidity and depending on how many times an image carrier and developing agents have been used. Phenomena that a width of a line-shaped toner image varies in an image forming apparatus wherein toner images are formed on an image carrier through reversal development will be explained as follows, referring to FIGS. 12(a)–12(e).

FIGS. 12(a)–12(e) are illustrations explaining the phenomena that a width of a line-shaped toner image varies. In FIGS. 12(a)–12(e), the ordinate represents electrical potential and the abscissa represents a length, and density and a line width of a toner image are illustrated. $V_Z$ shown with two-dot chain lines represents residual electrical potential. FIG. 12 (a) is an illustration showing a latent image formed through imagewise exposure conducted after an image carrier has been charged electrically. FIG. 12 (b) shows a portion which is equivalent to an amount of toner sticking when the latent image shown in FIG. 12 (a) is developed and a dotted line shows surface electrical potential of toner. FIG. 12 (c) is an illustration showing electrical potential of a latent image wherein the residual electrical potential $V_Z$ is raised from the initial state shown in FIG. 12 (a) due to repeated use. A one-dot chain line in FIG. 12 (d) shows a portion being equivalent to an amount of toner in the occasion where the latent image shown in FIG. 12 (c) is developed. In this case, although a difference from a line width of a toner image shown in FIG. 12 (b) is almost zero, a fall of image density is observed. The dashed line shows development performed by controlling development conditions for correcting the fall of image density mentioned above, and it shows that image density can be made the same but the line width is increased. FIG. 12 (e) shows the state wherein γ characteristics of a photoreceptor layer of an image carrier made a slight direction change, and it shows that a line width is narrowed though the maximum image density remains unchanged when development is conducted under the conditions mentioned above.

In order to control the aforementioned change in image density and a line width, there have been employed a method wherein environmental conditions such as temperature and humidity are measured and correction is made by setting a charging voltage to be higher when the temperature is high, and a method wherein reflection density of a toner patch is measured and thereby a line width and image density of a toner image are detected to be fed back. It is considered that this line width measuring means includes a direct measuring system and an indirect measuring system.

FIG. 10 is a block schematic diagram showing a line width measuring means that measures directly a line width of a toner image.

The line width measuring means of such a direct measuring system is equipped with imaging lens $L_1$ which forms light from light source P on image carrier Z and with imaging lens $L_2$ which enlarges and forms light reflected from toner image $T_G$ carried by the image carrier Z on light receiving element LS, and it detects a line width of a toner image by counting output signals from the light receiving element LS.

FIG. 11 is a block diagram showing a line width measuring means that measures a line width of a toner image indirectly.

The line width measuring means of such an indirect measuring system is equipped with imaging lens $L_1$ which forms light from light source P on image carrier Z and with imaging lens $L_3$ which reduces and forms light reflected from toner image $T_G$ carried by the image carrier Z on light receiving element LS, and it detects the change in the covering rate on the surface of the image carrier as a change of an amount of light reflected from light receiving element PD having a single light receiving section. With regard to the light receiving element PD employed in this case, the one having a single light receiving section is enough, which makes the line measuring means to be less expensive than a line width measuring means which measures a line width directly shown in FIG. 10.

However, despite the feedback conducted by correcting charging voltage and measuring reflection density of a toner patch mentioned above, the change in a line width is as small as several to 10 $\mu$m. Therefore, there has been no inexpensive unit capable of measuring directly. To be concrete, a line width measuring means shown in FIG. 10 tends to be expensive because it requires a line sensor formed with a pitch of several microns per pixel for detecting accurately the variation of line widths, and a magnification of an optical system composed of light receiving element $L_2$ needs to be about 10. Under the assumption that a focal length of the optical system mentioned above is 5 mm, a total size of a sensor is 50 mm or more, which makes it difficult to incorporate the sensor in an image forming apparatus which is in its tendency to be made smaller. On the other hand, the line width measuring means explained referring to FIG. 11 can not measure by discriminating a change in a line width and a change in image density because a toner image is taken as a form including a plurality of line-shaped toner images. Therefore, even if the image density can be maintained at a prescribed level by adjusting developing conditions, a level of output from light receiving element PD relates to a line width of a toner image. Therefore, changes in environmental conditions, changes with passage of time, and contamination cause an output to vary, and it has been impossible to correct the errors. In addition, there has been no sensor capable of being used after being incorporated in an apparatus because absolute accuracy of the sensor is required in all methods. Further, a circuit that drives a line sensor and a circuit that reads output signals from the line sensor are complicated in structure and are expensive.

SUMMARY OF THE INVENTION

In view of the above-mentioned problems, an object of the invention is to provide a line width controlling method wherein a line width of a toner line image is detected at a level of several microns to ten microns and thereby the reproduced toner line image is controlled to a predetermined line width.

The object of the invention mentioned above can be attained by the following.

(1) A line width controlling method comprising of a pulse width controlling process that adjusts pulse width signals controlling light emission of a light source, a latent patch image forming process that forms a latent patch image comprising of a plurality of latent line images by irradiating light from the light source, an image visualizing process that visualizes the latent patch image to be a toner patch image comprised of toner line images, a process that forms plural toner patch images having different gradation by repeating processes from the pulse width controlling process to the image visualizing process, a process for measuring optical density of the plural toner patch images, so as to obtain a variation curve of the optical density, an inflection point detecting process that detects an inflection point in the variation curve of the optical density from the plural toner patch images by using index signals for controlling the light source, and a process condition adjusting process that adjusts conditions for an electrophotographic process from data at the inflection point.

(2) The line width controlling method according to the aforementioned item (1), wherein the aforementioned toner patch image is formed of a plurality of superposed color toners.

(3) The line width controlling method according to the aforementioned item (1) or (2) wherein the aforementioned toner patch image is comprised of toner line images line widths of which are constant and intervals of which are varied.

(4) The line width controlling method according to the aforementioned item (1) or (2) wherein the aforementioned toner patch image is comprised of said toner line images line widths of which are varied.

(5) The line width controlling method according to the aforementioned item (1) or (2) wherein a size of the aforementioned toner patch image is greater than a measurement range for a sensor.

BRIEF DESCRIPTION OF THE DRAWINGS

FIGS. 12 (*a*)–(*e*) are illustrations explaining phenomena that a width of a line-shaped toner image varies.

DETAILED DESCRIPTION OF THE INVENTION

Figure 1:
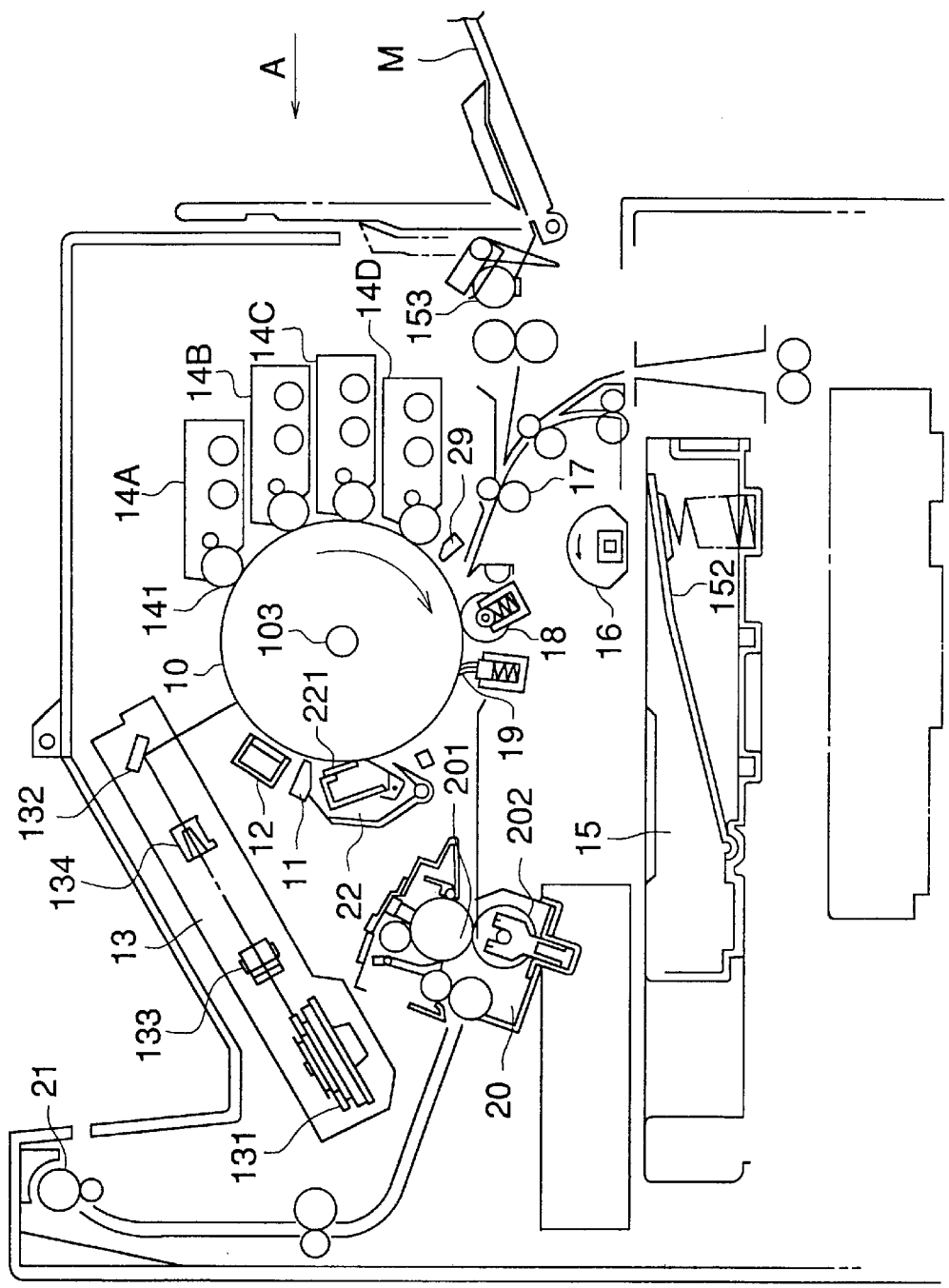
FIG. 1 is a schematic structural diagram showing an image forming apparatus of the present example.
Figure 5:
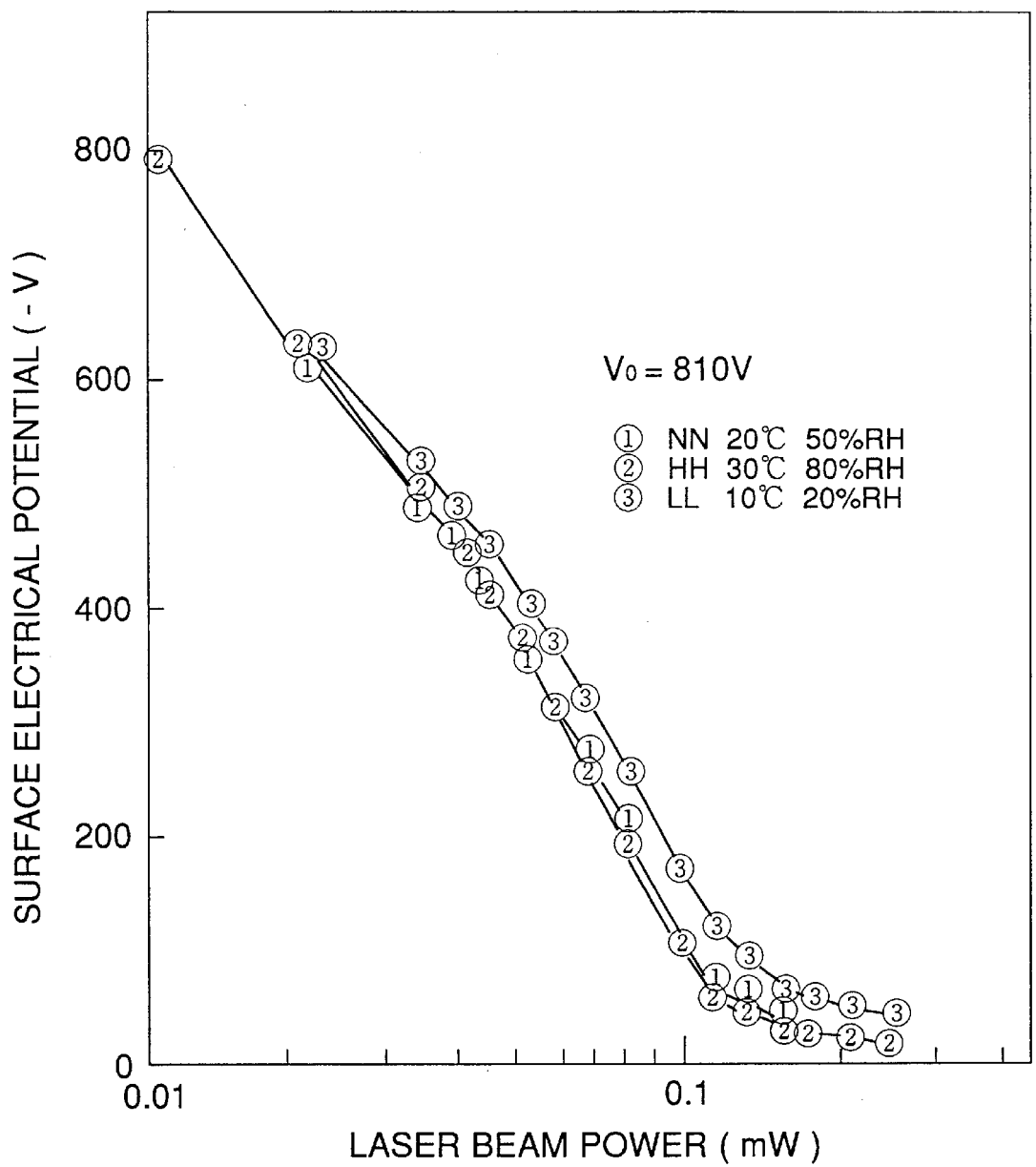
FIG. 5 is a graph showing voltage characteristics of an image carrier employed in an image forming apparatus of the present example.

FIG. 1 is a schematic structural diagram showing an image forming apparatus of the present example and FIG. 5 is a graph showing voltage characteristics of an image carrier employed in an image forming apparatus of the present example.

In an image forming apparatus of the present example, charging unit 12 charges electrically each time image carrier 10 makes one turn as shown in FIG. 1, a color-separated electrostatic latent image is formed on the image carrier 10 through imagewise exposure made by writing unit 13, the electrostatic latent image is visualized on the image carrier 10 to be reproduced as a toner image in full colors through an operation selected from developing units 14A–14D each housing therein a two-component developing agent comprised of a carrier and each of yellow, magenta, cyan and black toners, and a series of processes for forming the toner image on the image carrier 10 is repeated several times for each color and thereby toner images each having a different color are superposed on the image carrier 10, and then, are transferred by transfer roller 18 collectively onto a transfer material fed from sheet-feed cassette 15. After that, the toner images are fixed by fixing unit 20.

A main body frame of an image forming apparatus is formed by side panel 1 (not shown) and side panel 2 (not shown) both of which stand upright. Between the side panel 1 and the side panel 2, there incorporated writing unit 13, image carrier 10, developing device 120 housing therein a plurality of developing units 14A–14D, developing unit 20 and D.C. power supply unit (not shown), and outside the side panel 2, on the other hand, there are incorporated a driving system, a formatter (not shown) that decodes printer commands and a control board (not shown) for controlling operation sequence of a machine. Further, toner supply device 140 to be connected to each of developing units 14A–14D in the developing device 120 is housed at the upper portion of the developing device 120.

Image carrier 10, charging unit 12 and cleaning unit 22 are incorporated in drum cartridge 130 (not shown) to be integrated, while, developing units 14A–14D and toner supply means (not shown) are incorporated in holder 100 (not shown) to be integrated. The holder 100 is equipped with a mechanism which positions at a location where an image forming operation can be performed, or moving almost horizontally from a mounting position against an apparatus main body as shown in FIG. 1 and setting to the drawn out position.

Inside the side panels 1 and 2 forming the main body of an apparatus, there is provided guide roller 53 (not shown) so that it faces upper rail 51 (not shown) and lower rail 52 (not shown), while, the holder 100 has plate-shaped member 41 which is provided on its both sides with rotary rollers 42, and the rotary roller 42 and the plate-shaped member 41 are engaged respectively with the guide member 50 and the guide roller 53 to be supported. This is the general constitution of the apparatus for attaining the aforementioned function.

The constitution and function of each member will be explained as follows.

The image carrier 10 is an electrophotographic photoreceptor wherein a subbing layer having a layer thickness of 0.3 $\mu$m is coated on a conductive support formed of aluminum and having a diameter of 120 mm by the use of alcohol-soluble polyimide, CGL having a layer thickness of 0.3 $\mu$m is coated on the subbing layer by coating CGL agent in which titanyl phthalocyanine of Y type and polyvinyl butyral are dispersed, and CGL having a layer thickness of 25 $\mu$m composed of polycarbonate and stiltriphenylamine compound is coated on the CGL, so that an intermediate layer and a photoreceptor layer are laminated, and it is grounded. On driving shaft 103 of the image carrier 10, there is provided an encoder (not shown), and thereby MPU 210 detects the phase of the image carrier 10 for performing an electrophotographic process.

Now, the potential characteristics of the image carrier 10 will be explained as follows, referring to FIG. 5.

The ordinate in the graph shown in FIG. 5 represents surface electrical potential (−V) of the image carrier 10, and the abscissa represents the semiconductor laser beam power (mW). (1) represents electrical potential characteristics under 20° C. and 50% RH (hereinafter referred to also as normal temperature normal humidity NN), (2) represents electrical potential characteristics under 30° C. and 80% RH (hereinafter referred to also as high temperature high humidity HH), and (3) represents electrical potential characteristics under 10° C. and 20% RH (hereinafter referred to also as low temperature low humidity LL). From this graph, it is understood that the surface electrical potential on an exposure area of the image carrier 10 varies depending on environmental temperature and humidity. In this case, the exposure area is defined to be an area other than initial charging voltage.

Both flanges 101 and 102 (not shown) supporting the circumferential surface of the image carrier 10 are arranged to be rotatable around driving shaft 103, and fixing member 104 (not shown) affixed on the driving shaft 103 and flange 101 are linked by spring member 105 which is provided between them. Such constitution gives the same effect as that obtained in the case when rigidity of a driving system comprised of the image carrier 10 and driving shaft 103 is lowered, and it is possible to lower the characteristic frequency and thereby to avoid sympathetic vibrations with variation of vibration from driving gear G. It is also possible to make variation of the speed of revolution inputted in the driving shaft 103 to be absorbed by a low-rigidity member and thereby to make the image carrier 10 to rotate without causing linear speed variation of 100 mm/sec.

When the driving torque transmission system with the constitution mentioned above is realized, the image carrier 10 can rotate stably. Therefore, PCL11 makes exposure using a light-emitting diode or the like, prior to negative charging by charging unit 12, to neutralize the circumferential surface of a photoreceptor layer of the image carrier 10 so that hysteresis on the photoreceptor covering up to the previous printing may be eliminated. The charging unit 12 gives uniform charging of VH-850V by making corona discharge from a corona discharge wire comprised of a grid held to voltage of VG against the circumferential surface of the image carrier 10 and of a platinum wire (clad or alloy).

In the writing unit 13, after uniform charging on the photoreceptor layer of the image carrier 10, an optical path from a light source of a not illustrated laser diode passing through a rotating polygon mirror 131 and fθ lens 133 is deflected by reflection mirror 132 for scanning based on image signals, and thereby a latent image is formed on the image carrier 10 while it is rotating (sub-scanning). Namely, image data from a formatter are sent to a laser diode (LD) modulation circuit, and when the modulated image signals cause the laser diode to emit light, the light beam is subjected to synchronization of each scanning line conducted by beam index 136 (not shown) through mirror 137 (not shown), and is projected on polygon mirror 131. The polygon mirror 131 reflects the light beam with its polyhedron for scanning, and its scanning light, after being corrected in terms of a beam shape by fθ lens 133 and cylindrical lens 134, exposes a photoreceptor through reflection mirror 132 for main scanning which forms an electrostatic image. The polygon mirror 131 is a hexahedral mirror having the rate of rotation of 23600 r.p.m. and it employs an air bearing. A focal length of each of the fθ lens 133 and cylindrical lens 134 is f=140 mm. A dot clock is 20 MH$_Z$. A beam size is about 140×100 μm. The latent image voltage of such beam size is V$_L$−50V.

For obtaining an image of high image quality, it is necessary to make a toner particle size small. In the present example, toner having a particle size of 8 μm is used for each color. However, what is most important for users is quality of black characters, and small particle size toner (7 μm–11 μm) is optimum for black toner. Based on the foregoing, printing density of the image forming apparatus is 12 dot/mm and dot pitch is 1/12 mm for both main scanning and sub-scanning directions.

Toner supplied from a toner box (not shown) is dropped on the right end portion of a developing unit, and is stirred and mixed with carrier by paired stirring screws rotating counter to each other to be set to a predetermined charge amount (Q/M).

On the other hand, toner density is detected through the L detection method, and an amount of toner to be supplied is controlled depending on the output frequency from the detection so that a toner density value may be set and controlled to about 5–7%.

Stirred two-component developing agent is transported to developing sleeve 141 through supply roller 143, then is made to be a thin layer by a layer thickness regulating member (not shown) so that 20–30 mg/cm$^2$ of the developing agent may be transported to a developing area on the image carrier 10 where the electrostatic latent image is subjected to reversal development under the developing conditions described below.

A clearance between developing sleeve 141 and image carrier 10 at the developing area is made to be 0.5 mm which is greater than a layer thickness (developing agent), and A.C. bias of 2 KV and 8 KH$_Z$ and a D.C. bias of −750 V are impressed to be superposed on this clearance. The developing sleeve 141 rotates against the rotation of the image carrier 10 and V DC, VH and toner charging are of the same polarity. Therefore, toner stimulated by V AC to leave the carrier does not stick to the VH portion whose voltage is higher than V DC, but sticks to the VL portion whose voltage is lower than V DC. Thus, visualization (reversal development) is carried out.

It is also possible to make a toner supply unit to be simple and small by using a toner bottle for filling the aforesaid unillustrated toner box as a toner hopper, and it is possible to attain an easy visual check of residual toner amount by forming the toner bottle with a translucent material.

Transfer materials (not shown) are loaded on sheet feed cassette 15 to be aligned to the reference plane at one side, and therefore, fanning claw 151 is provided only on the reference plane side of the transfer material, and further, a half-moon roller 16 is made to be of a cantilever type and it is positioned to be deviated to the reference plane side of the transfer material.

A sheet feed section has its own motor (not shown), and the half-moon roller 16 rotates in the arrowed direction so that only the topmost sheet may be fed out through the operation of the fanning claw 151 for transfer materials stacked on push-up plate 152.

The transfer material fed out of the sheet feed cassette 15 enters a transport path and then makes a U turn, and immediately after the tip of the transfer material has passed sheet feed roller 17, a motor is stopped temporarily by the detection of an unillustrated sheet feed sensor. After that, when the timing has been adjusted for transferring, the motor starts rotating to feed the transfer sheet to the developing area while the transfer sheet is forming a predetermined angle with the surface of the photoreceptor layer of the image carrier 10.

On the other hand, for manual sheet feeding, manual sheet feeding stand M positioned on the front side of the apparatus main body is swiveled from its position indicated with one-dot chain lines to that indicated with solid lines to be set.

A sheet fed in manually is transported by rotation of pick-up roller 153, and then is fed to a transfer area through the same process as that for sheet feeding from the aforementioned sheet feed cassette 15.

A sheet to be fed manually includes ordinary transfer materials P with 161 bs to 241 bs used generally and it also includes thick sheets with 361 bs and transparencies for OHP. Further, it is possible to feed even envelopes by removing the manual sheet feeding stand M and by mounting an exclusive feeder as an option.

Transfer roller 18 is variable in its position to the circumferential surface of the image carrier 10, and it is always positioned to be in pressure contact with the circumferential surface for printing of monocolor images, but it is kept to be away from the circumferential surface while color images are being formed and is brought into pressure contact only when transferring is performed. On the other hand, separating brush 19 is also brought into pressure contact with and separated from the circumferential surface of the image carrier 10 synchronizing mostly with change in position of the transfer roller 18. Voltage impressed on such transfer roller 18 is +3–4 KVDC, and the transfer roller 18 of a type wherein the roller surface is cleaned by a blade is used. The separating brush 19 is impressed with a DC-AC superposed bias voltage.

Fixing unit 20 is a fixing unit of the so-called heat roller type that is comprised of a pair of rollers wherein transfer material P is heated and transported for fusion of toner images thereon by a nip portion formed between upper roller 201 housing therein heater H and rotating clockwise for driving and lower roller 202 that is in pressure contact with the upper roller 201 to be driven to rotate. Each of the upper and lower rollers is covered by a heat-resistant tube, and thereby a nip portion is formed to be line-shaped by pressure contact. Thus, creases on the sheet which tend to be caused when envelopes and others are transported can be prevented. A temperature on the circumferential surface of the upper roller 201 is controlled to be kept within a predetermined temperature range by being detected by temperature sensor S. The sticking stain caused by fusion of toner can be removed and cleaned by pressure contact of cleaning roller 203. The cleaning roller 203 is replaced with a new one after being used for making 40,000 copies. A fixing heater enters its SLEEP mode to be controlled for energy conservation when it is out of service for a period exceeding a prescribed period of time.

Further, when a transparency used for OHP is used as a transfer material, silicone oil is coated on the roller surface by oil pad 204 on the circumferential surface of the upper roller for the purpose of smoothing the toner image surface and thereby preventing diffused reflection for improving the transmission factor of a color toner image.

Therefore, the apparatus in the present example can be equipped with modes which make it possible to use three types of transfer materials of ordinary sheets, envelopes and transparencies to cover broad application, by making the transport speed for transfer materials to be changeable in three steps of 100 mm/sec, 50 mm/sec and 12.5 mm/sec.

The temperature to be set for the upper roller 201 can be lowered to about 180° C. by using toner that is fused at a low temperature, and a problem of uneven pressing can be solved and uniform oil coating can be realized by using sponge material (porous PTFE coated) for oil pad 204.

The foregoing is an outline of the constitution of an image forming apparatus in the present example.

Next, control circuits of the image forming apparatus will be explained as follows.

Figure 2:
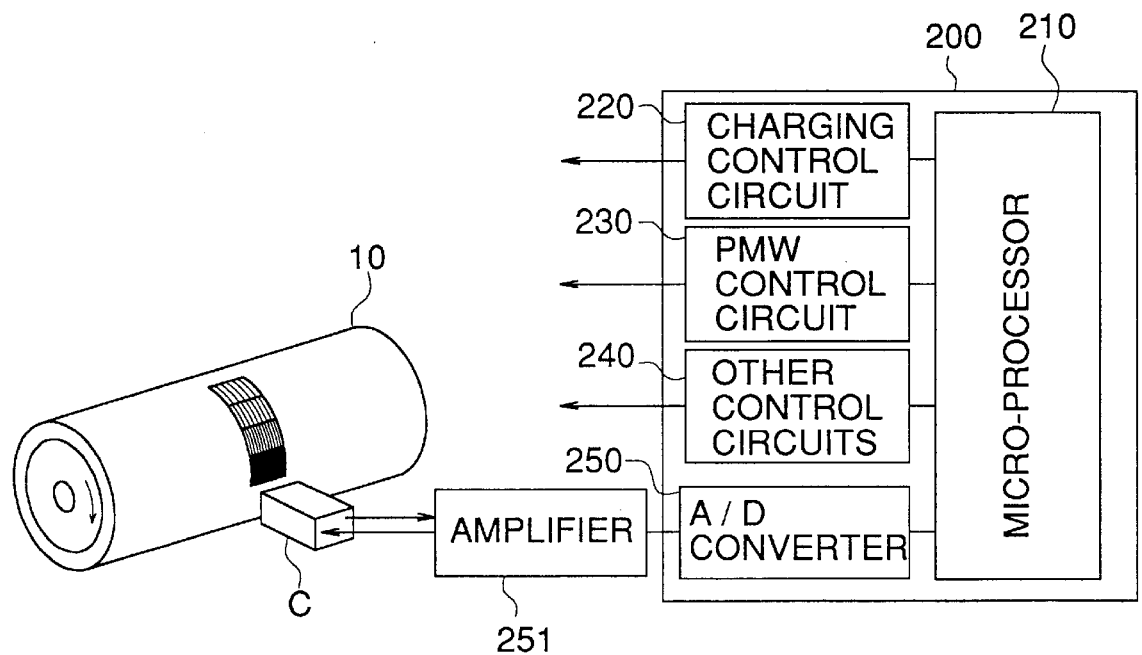
FIG. 2 is a block diagram showing a control circuit in an image forming apparatus of the present example.
Figure 3:
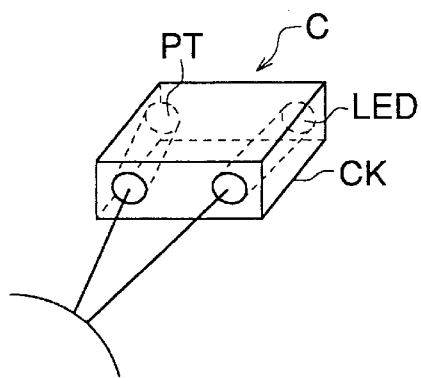
FIG. 3 is a perspective view showing how image density sensor C is arranged.

FIG. 2 is a block diagram showing control circuits in the image forming apparatus in the present example, and FIG. 3 is a perspective view showing how image density sensor C is arranged.

Control circuit 200 is equipped, as shown in FIG. 2, with microprocessor 210 (hereinafter referred to as MAU for abbreviation), A/D converter 250, RAM 220 wherein a program for charging control is written, RAM 230 wherein a program module for executing PWM control is written, RAM 240 wherein a program module for executing other electrostatic and photographic processes is written, RAM (not shown) wherein a program for constituting developability fixing means is written, and RAM wherein a program for constituting printer characteristics detecting means and maximum image density converting means is written. PMU210 is connected to a solenoid for driving stirring screws through a driver (not shown).

The printer characteristics detecting means is comprised of image density sensor C, MPU 210 and test patch signal $S_G$, and it detects actual printer characteristics and maximum image density therefrom. The program also includes the program equivalent to the maximum image density converting means.

The program equivalent to the image density detecting means is one that obtains image density signals by considering the difference between density on the image carrier 10 and that on a transfer sheet in the value obtained by logarithm-converting the ratio of output voltage normalized to 256 gradations by A/D converting brightness signals to the rated maximum output of image density sensor C (output based on the image carrier attracting nothing thereon), and it conducts a predetermined process on brightness signals obtained from a plurality of patch images visualized on the image carrier 10 and thereby calculates averaged values, for example, for the purpose of eliminating the detection error caused by vibration generated in the course of rotation of the image carrier 10 [Japanese Patent Publication Open to Public Inspection No. 41375/1989 (hereinafter referred to as Japanese Patent O.P.I Publication). Owing to the foregoing, MPU 210 can detect printer characteristics and maximum image density both of which are free from detection error caused by a vibration of the image carrier 10.

MPU 210 is a toner density control system that controls, through change of magnetic permeability, the toner density to be constant independently of developability, and it keeps developability in a reversal developing method to be constant by changing the rate of rotation of developing sleeve 141 for the purpose of avoiding an influence of a change in sensitivity characteristics of a photoreceptor layer as in a means to detect optically an amount of development on an image carrier.

The toner density control means is one wherein magnetic permeability of developing agent filled in developing units 14A–14D is detected by toner density sensor TS and thereby a toner supply unit (not shown) is driven to control the toner density to be almost constant.

A program constituting a developability fixing means is one wherein the rate of rotation of developing sleeve 141 is controlled depending on patch toner image 1 visualized on image carrier 10, and thereby developability exceeding the sensitivity characteristics of a photoreceptor layer can be obtained, and it controls the rate of rotation of developing sleeve 141 by controlling the toner density related closely to developability to be constant, and thereby it changes an amount of developing agent sticking to the surface of image carrier 10 at its developing area to adjust the maximum image density. The program constituting a developability fixing means is one wherein a mechanism and a program to control the toner density in a developing unit to be constant are contained when a two-component developing agent is employed. A/D converter 250 is connected to image density sensor C through amplifier 251. The amplifier 251 is one wherein output level from image density sensor C is amplified to the drive voltage level of microprocessor 210.

The image density sensor C is formed so that casing CK shown in FIG. 3 is provided with grooves in which the angle between the light-receiving axis of the light-emitting diode LED (light-emitting diode LN66, made by Kagoshima Matsushita Denshi Co.) and the normal line of image carrier 10 is set to 40° and the angle between the light-receiving axis of photo-transistor PT (photo-transistor PN101, made by Kagoshima Matsushita Denshi Co.) and the normal line is also set to 40°, and light-emitting diode PD and photo-transistor PT are inserted respectively in the grooves. The casing CK is arranged so that its front surface may be in parallel with the surface of image carrier 10 and may direct to the center of the image carrier 10 being away from the surface thereof by 6 mm, in the vicinity of cleaning unit 22. The image density sensor C is comprised of light-emitting diode LED and phototransistor PT. To the anode terminal of the light-emitting diode LED, there is connected a variable D.C. power supply $V_{ref}$ (not shown) with maximum output of 10 (V), and to the cathode terminal of the light-emitting diode LED, there are connected semi-fixed resistor element VR1 (not shown) capable of being switched between 1 k($\Omega$) and 2 k($\Omega$) and fixed resistor element R8 (not shown). With the constitution mentioned above, the emitting intensity of the light-emitting diode LED is adjusted by changing the output voltage of the variable D.C. power supply $V_{ref}$. To the anode terminal of the phototransistor PT, there is connected D.C. power supply $V_{DC}$ with 10 V, and to the cathode terminal thereof, there is connected an output detecting circuit comprised of operational amplifier IC (not shown) and fixed resistor elements R5 and R6 (not shown). With this constitution, voltage corresponding to light intensity sensed by the phototransistor PT is detected. Owing to this, light reflected from a toner image can be received efficiently.

In the method of determining an amount of emitted light of light-emitting diode LED constituting image density sensor C, the amount of emitted light is determined in a way that the output voltage from phototransistor PT which receives light reflected from image carrier 10 (no toner sticking) while light-emitting diode LED is emitting is made to be $V_0$. Owing to this, it is possible to correct contamination on a dust-proof glass (not shown) constituting image density sensor C and on the surface of image carrier 10.

The foregoing represents the mechanical and electrical constitution in the image forming apparatus of the present example.

Now, a patch image employed in the present example will be explained as follows.

FIGS. 4(a) and 4(b) are illustrations wherein a patch image formed on an image carrier is enlarged.

Patch images are those (FIGS. 4(a) and 4(b)) which are formed on image carrier 10 prior to formation of target images and each of which is composed of toner images having its specific line width.

Figure 4:
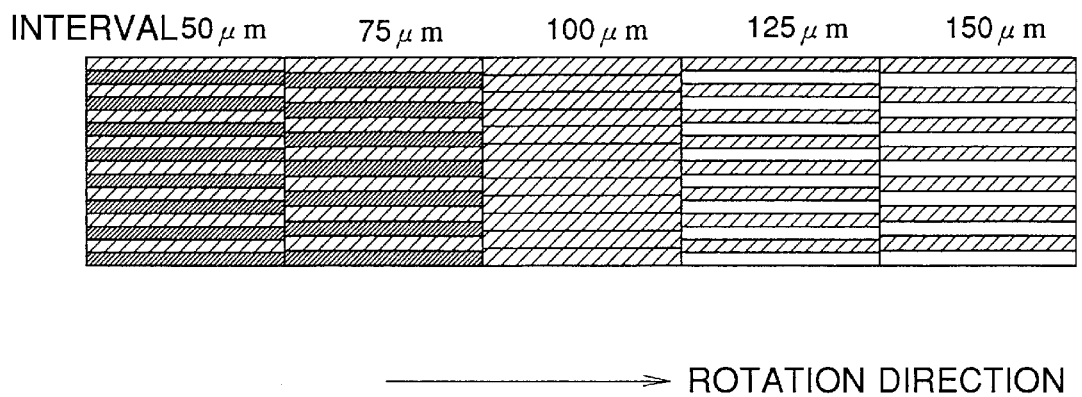
FIGS. 4 (*a*) and (*b*) are illustrations wherein patch images formed on image carriers are enlarged.
Figure 4:
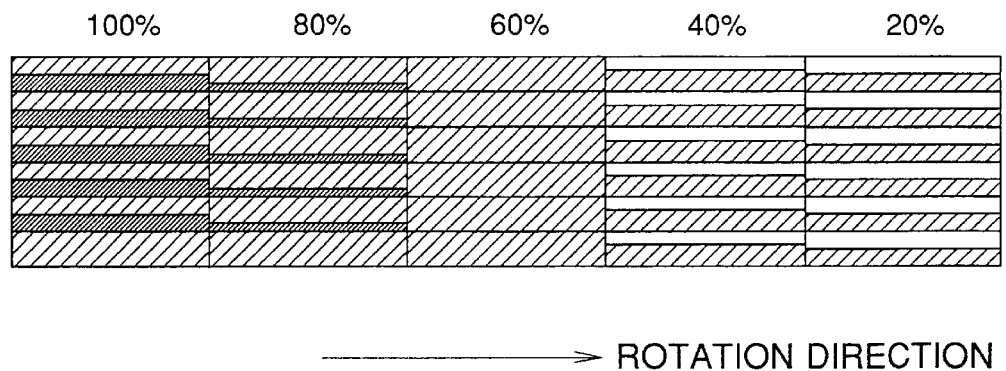

In FIGS. 4(a) and 4(b), an arrow mark indicates the direction of rotation of image carrier 10, and hatched portions represent areas where toner is sticking. FIG. 4 (a) shows five patch images wherein a line width of a line forming a patch image is fixed to 50 $\mu$m to be constant and intervals between lines are changed in succession to be 50 $\mu$m, 75 $\mu$m, 100 $\mu$m, 125 $\mu$m and 150 $\mu$m. FIG. 4 (b) also shows five patch images wherein a line width of a line forming a patch image is changed in succession to be 100%, 80%, 60%, 40% and 20%. In any patch image, a toner line image forming the patch image is the same in terms of basic operation independently of a specific single color or a secondary color wherein two colors of Y. M. C. and K. are superposed. It is preferable that a line width of a line image having the finest width among those forming a patch image is established to the width which does not interfere with adjoining toner images even in the case of considering all variations estimated. It is preferable that the thickest width is established to the width which always interferes with adjoining toner images even in the case of considering all variations estimated. It is also preferable for ensuring the sensitivity that a size of a patch image is set to be greater than a measurement range of a sensor.

Figure 6:
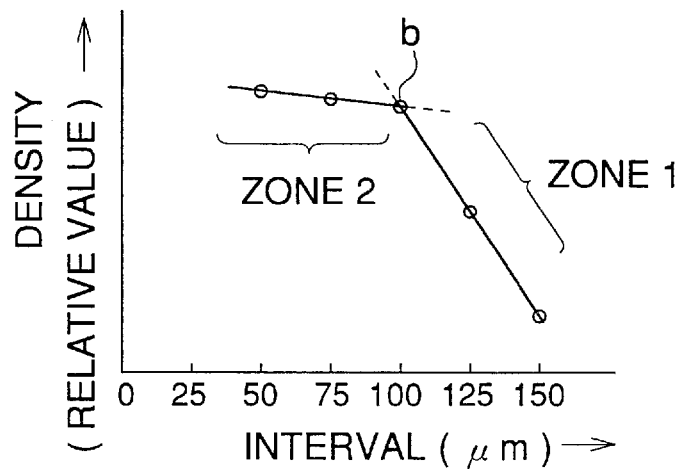
FIG. 6 is a graph showing the relation between reflection density and a line interval.
Figure 7:
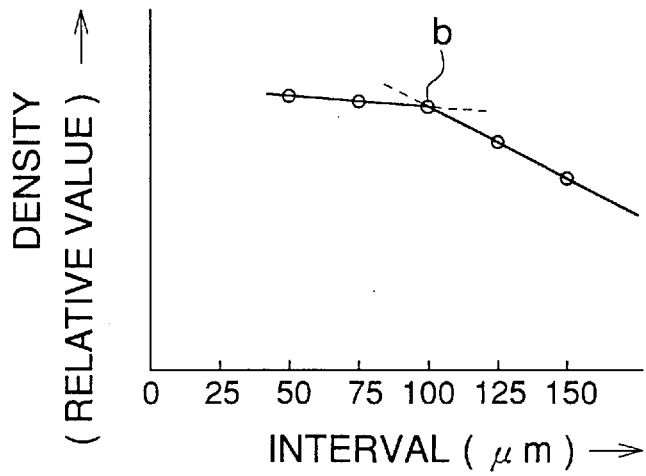
FIG. 7 is a graph showing the relation between reflection density and a line interval.

Each of FIGS. 6 and 7 is a graph showing the relation between reflection density and intervals of lines.

Graphs shown in FIGS. 6 and 7 show the relation between reflection density obtained from patch images in FIG. 4 (a) and pulse widths. A graph in FIG. 7 shows an occasion wherein measurement values of density were affected by contamination to be higher. Both cases indicate that an inflection point b exists. Since regular reflection from patch images shown in FIG. 4 (a) is 10 times or more the reflection from toner, the change is great in the course that toner images cover the surface of image carrier 10 as shown in zone 1 in FIG. 6. It is indicated that after the toner images have covered the surface of image carrier 10, the change caused by an increase of toner layers is gentle as shown in zone 2 in FIG. 6.

Figure 8:
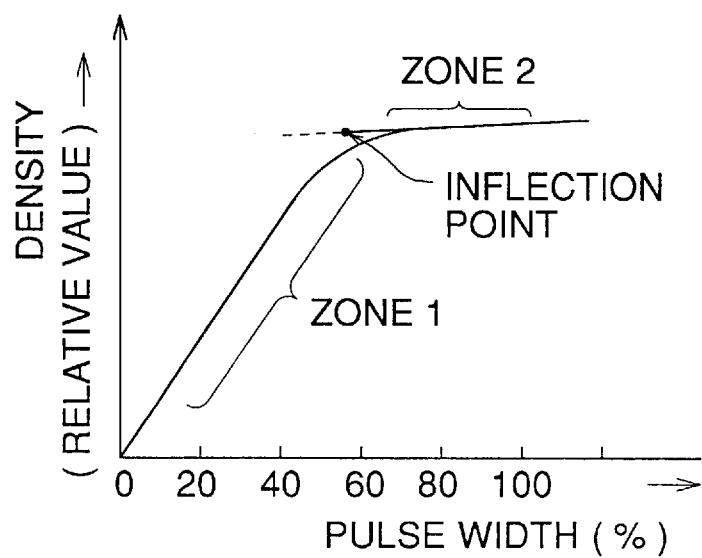
FIG. 8 is a graph showing the relation between reflection density and a pulse width.
Figure 9:
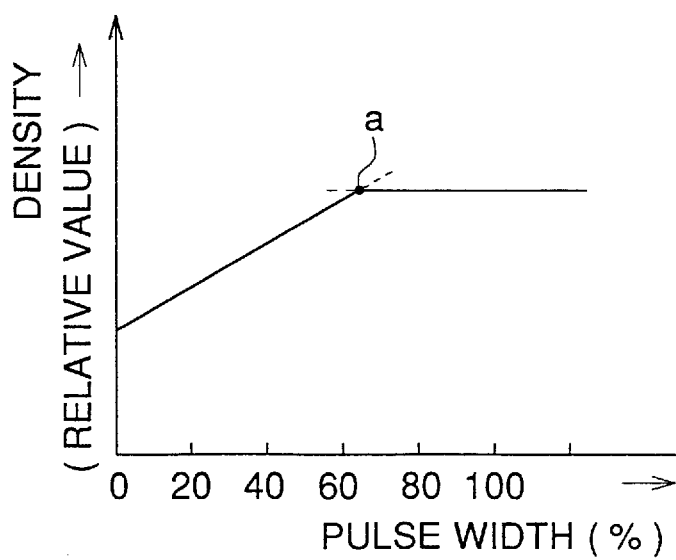
FIG. 9 is a graph showing the relation between reflection density and a pulse width.
Figure 10:
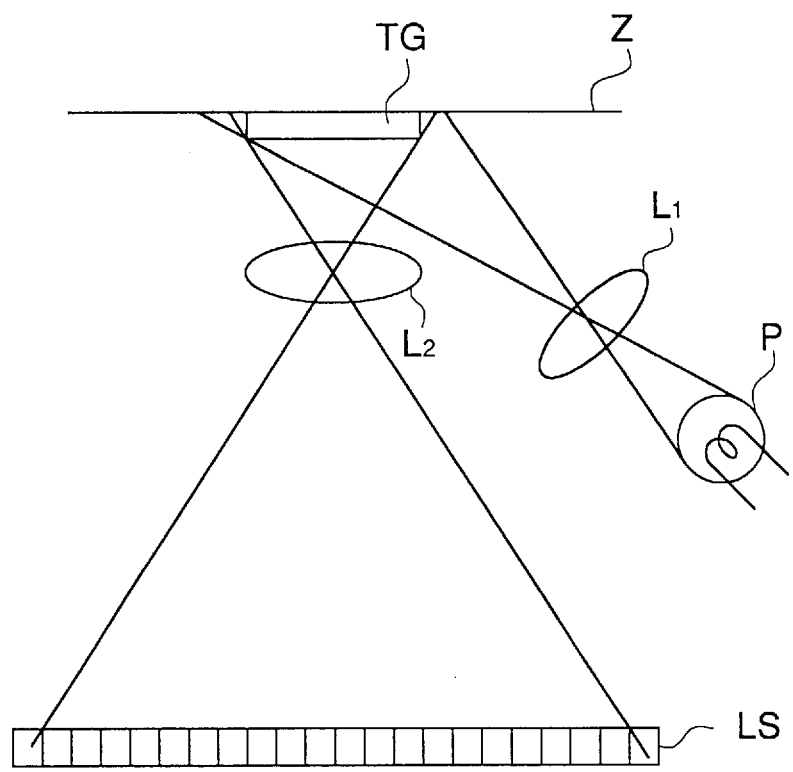
FIG. 10 is a block diagram showing a line width measuring means that measures a line width of a toner image directly.
Figure 11:
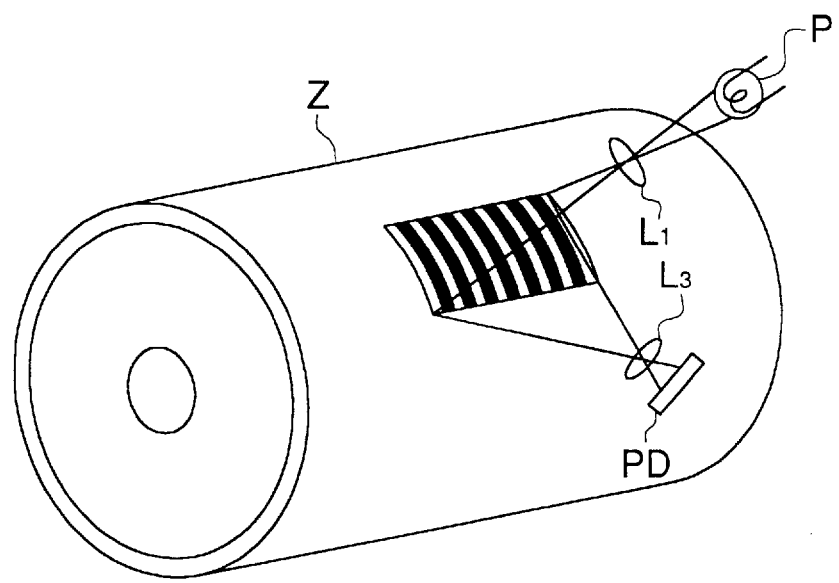
FIG. 11 is a block diagram showing a line width measuring means that measures a line width of a toner image indirectly.

Each of FIGS. 8 and 9 is a graph showing the relation between reflection density and pulse widths.

Graphs shown in FIGS. 8 and 9 show the relation between reflection density obtained from patch images in FIG. 4 (b) and pulse widths. A graph shown in FIG. 9 indicates an occasion wherein the graph in FIG. 8 has been changed in terms of sensitivity of the image carrier by environmental changes and changes with passage of time. Both cases indicate that an inflection point a exists. Since regular reflection from patch images shown in FIG. 4 (b) is 10 times or more the reflection from toner, the change is great in the course that toner images cover the surface of image carrier 10 as shown in zone 1 in FIG. 8. It is indicated that after the toner images have covered the surface of image carrier 10, the change caused by an increase of toner layers is gentle as shown in zone 2 in FIG. 8.

Next, a line width controlling method in an image forming apparatus of the present example will be explained as follows.

There will be explained a process for establishing the rate of rotation of developing sleeve 141 for obtaining the desired maximum image density (1.4) in the image forming apparatus.

An operator sends an instruction to start copying to MPU 210 from an operation panel (not shown). The MPU 210 detects the phase of image carrier 10 by the use of phase signals outputted from an encoder (not shown), and makes the image carrier 10 to rotate in the arrowed direction (see FIG. 1 and others) based on the detected phase. The MPU 210 impresses a prescribed output voltage on charging unit 12 from a high-tension power supply (not shown), and thereby the charging unit 12 starts discharging to charge uniformly an image forming area of the image carrier 10. After that, the MPU 210 causes light-emitting diode LED (see FIG. 3) constituting image density sensor C to the output voltage of variable D.C. power supply $V_{ref}$ and establishes an output voltage of the variable D.C. power supply $V_{ref}$ so that sensor output at a portion having no toner patch may be 7 (V). This impressing voltage is used for oscillation so that infrared light is irradiated on image carrier 10. Patch images are formed on the image carrier 10. For exposure level for forming the patch images, PMW255 which is of a maximum exposure amount is used. Latent images prepared in the above way are developed by developing sleeves 141 each having a different rate of rotation. The rate of rotation of the developing sleeve 141 is raised from 100 r.p.m. to 450 r.p.m. with an increment of 25 r.p.m. A plurality of patch images as shown in FIG. 4(b) prepared in this way are read by image density sensor C. When the output value obtained through reading by the image density sensor is equal to or lower than the sensor output 1.5 V corresponding to 1.4 in fixed image density (using an image density meter made by Macbeth Co.), the rate of rotation of the developing sleeve 141 is fixed, ensuring that the maximum image density of 1.4 or more is assured by the printer. Incidentally, the rate of rotation of the developing sleeve 141 is fixed to 225 r.p.m.(ratio of linear speed of developing sleeve to linear speed of image carrier is about 1.60) at normal temperature and normal humidity (20° C. 50% RH equivalent), though this depends on characteristics of the developing agent (charge amount, toner density, fluidity, and others) and surface potential characteristics of a photoreceptor layer.

Following the operation of determining the rate of rotation of the developing sleeve 141 mentioned above, the MPU 210 executes a line width measurement process which obtains indirectly the line width from reflection density of patch images wherein the width of a line-shaped toner image is shown in FIG. 4 (b).

To be concrete, the MPU 210 sends patch signals from RAM230 constituting PWM control means to a pulse width modulation circuit (not shown) constituting writing unit 13. The pulse width modulation circuit (not shown) sends to LD drive circuit (not shown) the modulation signals obtained by pulse-width-modulating patch signals equivalent to one scanning line. The LD drive circuit emits a laser beam by oscillating a semiconductor laser with modulation signals. This laser beam is deflected by a polygon mirror rotating at a prescribed speed, for scanning on image carrier 10 with a tiny spot through fθ lens, a first cylindrical lens and a second cylindrical lens. The operation of forming a latent image mentioned above is repeated for a prescribed number of operations. Upon detection of completion of the latent image forming operation, the MPU 210 detects the phase of image carrier 10 from phase signals sent from an encoder (not shown), and then drives developing units 14A–14D at the position synchronized with the latent image. Owing to this, the latent image formed on the image carrier 10 visualizes a plurality of patch images shown in FIG. 4(b).

The MPU 210 detects the phase of image carrier 10 from phase signals from an encoder, then causes light-emitting diode LED (see FIG. 3) constituting image density sensor C to change the output voltage of variable D.C. power supply $V_{ref}$ and establishes an output voltage of the variable D.C. power supply $V_{ref}$ so that the sensor output at a portion having no toner patch may be 7 (V). This impressing voltage is used for oscillation so that infrared light is irradiated on image carrier 10. With the constitution mentioned above, phototransistor PT constituting image density sensor C sends a sensor output corresponding to the intensity of light reflected from patch images visualized on image carrier 10 to MPU 210 through A/D converter 251.

When the sensor output obtained from the visualized patch images is 5.8 (V), the MPU 210 performs a calculation according to an expression such as –log 5.8 (V)/7 (V) since the maximum output of the sensor is 7 (V). The MPU 210 further interpolates with 32 data of PWM 0 to 248 so as to fill in the lacking data. The method of this interpolation is a known method such as a straight-line spline method and a Lagrange straight-line method, or it sometimes is an interpolation method that is specific in design. In this case, interpolation based on cubic spline function was performed (Kyoiku Shuppan: see Spline function and its application).

Since the maximum image density is fixed to 1.4 by the rate of rotation of developing sleeve 141, density calculation value –log (sensor output of PWM 255 level/7 (V)) of sensor output of PMW level 255 also needs to be 1.4. Since sensor output of PWM 248 is almost the same as that of PWM 255 because of characteristics of an image forming apparatus, –log (sensor output of PWM 248 level/7 (V)) also needs to be 1.4. Therefore, printer characteristics can be obtained by normalizing the calculation value of density obtained with the maximum image density of 1.4. With regard to density of PWM0, however, actual image density on a transfer sheet includes density of the transfer sheet itself, and therefore, (fixed image density obtained by densitometer)=(density of patch toner image on image carrier obtained from sensor output) is obtained by adding density of transfer sheet to the obtained density calculation value. Incidentally, it is also acceptable that MPU 210 reads patch images several times and the values of reading are averaged for improving detection accuracy.

In Japan or other countries where characters of many strokes are used, it is necessary to determine a line width which does not cause character blur and character cut in visual check even when printing by changing a line width, and it generally is between 100 μm and 120 μm. In the case of an image forming apparatus such as a printer or the like, charging voltage and a width of PWM are adjusted before it is shipped so that the line width may be 120 μm under the standard environment for usage. However, an image reproduced on a transfer material is subjected to the change in density and a line width caused by change with time of image carrier 10 and developing agent as well as by environmental change. Therefore, it is necessary to adjust charging voltage and PWM and reset them to the initial values by measuring density and a line width when turning on the power source or when starting the print operation.

In the image forming apparatus of the present example, MPU 210 measures print density to reset it to the initial value, then makes a line pitch to be the initial value of 120 μm, changes PWM values in succession, and obtains an inflection point. Namely, the MPU 210 obtains an intersecting point of tangent lines for a parabola in FIG. 8 as an inflection point a. The MPU 210 recognizes the inflection point a obtained in the aforesaid method as one showing that a line width of a toner image is equal to a pitch. The MPU 210 calculates an inclination of a series of plots showing the relationship between the pulse width and the density as shown in FIGS. 8 and 9 in which the inclination is used for forming the patch image that is for obtaining image density obtained according to the aforesaid method. The MPU 210 calculates an optimum pulse width from the aforementioned inflection point a.

In this case, a precision of calculating the inflection point a depends only on index signals for controlling the operation timing of writing means 13. Since a highly accurate quartz oscillator is used for obtaining standard signals in the line width detecting method in the present example, a precision of calculating inflection point a can be kept to be high. Therefore, in the line width measuring method in the present example, an absolute value of reflection density and a line width which requires image density sensor C to be highly accurate are not measured directly, but highly accurate signals such as index signals are used for detecting a line width. In the line width controlling method in the present example, therefore, a line width can be detected by the use of highly accurate signals even in the case of an image density sensor C which does not require a high precision. Further, in the line width controlling method in the present example, no high accuracy is required for mounting the image density sensor C. Accordingly, it is possible to reduce the number of steps for adjusting the image density sensor C. In addition, in the line width controlling method in the present example, nothing is affected by a sensitivity fall of the image density sensor C caused by environmental changes and changes with time.

In the present example, it has been explained that MPU 210 controls to adjust the pulse width signals for forming a latent image after a suitable PWM value is recognized through the aforesaid processing as an initial value. However, the invention is not limited to this, and MPU 210 can also control to adjust to the process condition by the factors such as grid voltage of charging unit 12, the rate of rotation of developing units 14A–14D and developing bias voltage. Further, control operations for patch images shown in FIG. 4 (*a*) are the same as those in the above-mentioned explanation.

Further, in this example, the linear speed of developing sleeve is measured firstly and the suitable value of pulse width modulation is measured secondly; however, it is possible to reverse the sequence of the measurements.

The invention provided with the aforementioned constitution can offer a line width controlling method wherein a toner line image reproduced by detecting a line width of a toner line image at several microns to ten microns can be controlled to a prescribed line width. Moreover, it is possible to detect a line width by the use of accurate signals even in the case of an image density sensor that is not accurate, because accurate signals such as index signals are used for detection of the line width. Again, since no high accuracy is required for mounting image density sensor C, the number of steps for adjusting the image density sensor can be reduced, and nothing is affected by a sensitivity fall of the image density sensor caused by environmental changes and changes with time.

In addition to the above-mentioned effects, the constitution mentioned above makes it possible to provide a line width controlling method capable of being applied also to an image forming apparatus employing a color image forming process.

In addition to the above-mentioned effects, the constitution described above makes it possible to provide a line width controlling method capable of enhancing sensitivity of a sensor.

What is claimed is:

1. A line width controlling method for controlling a line width of a toner image, comprising the steps of:

adjusting pulse width signals for controlling light emission of a light source;

forming a latent patch image, comprised of a plurality of latent line images, each latent line image corresponding to one scanning line of said light emission at various intervals or at various reflection densities, on an image carrier by irradiating light from said light source;

developing said latent patch image with toner so as to form a toner patch image comprised of toner line images;

repeating said forming step of forming said latent patch image and said step of developing said latent patch image to form said toner patch image for a plurality of times, wherein said toner patch image at each time of forming has a different gradation from that at other times of forming, so that a series of toner patch images is formed on said image carrier;

measuring an optical density of said series of toner patch images so as to obtain a variation curve of said measured optical densities;

detecting an inflection point in said variation curve of said measured optical densities; and adjusting said line width of said toner image according to data of said detected inflection point.

2. The line width controlling method of claim 1, wherein said toner patch image is formed of a plurality of superposed color toners.

3. The line width controlling method of claim 1, wherein said patch image is comprised of said toner line images of which line widths are constant and of which intervals between toner line images are varied.

4. The line width controlling method of claim 1, wherein said patch image is comprised of said toner line images of which line widths are varied.

5. The line width controlling method of claim 1, wherein said toner patch image has a size which is greater than a measurement range for a sensor.

6. The line width controlling method of claim 1, wherein said forming step of forming said latent patch image includes the step of:

controlling said light emission of said light source according to index signals so as to form said latent patch image.

7. A line width controlling method for controlling a line width of a toner image, comprising the steps of:

adjusting pulse width signals for controlling light emission of a light source;

forming a latent patch image, comprised of a plurality of latent line images, each latent line image corresponding to one scanning line of said light emission at various intervals or at various reflection densities, on an image carrier by irradiating light from said light source;

developing said latent patch image with toner so as to form a toner patch image comprised of toner line images;

repeating said forming step of forming said latent patch image and said step of developing said latent patch image to form said toner patch image for a plurality of times, wherein said toner patch image at each time of forming has a different gradation from that at other times of forming, so that a series of toner patch images is formed on said image carrier;

measuring an optical density of said series of toner patch images so as to obtain a variation curve of said measured optical densities;

detecting an inflection point in said variation curve of said measured optical densities;

determining a linear speed value of a developing sleeve in a developing device with which a maximum density of said toner image at a predetermined value is obtained;

setting a linear speed of movement of said developing sleeve at said linear speed value;

repeating said steps of forming said series of toner patch images, measuring said optical densities of said series of toner patch images, and detecting said inflection point in said variation curve;

determining a pulse width modulation value for controlling light emission of said light source with which a line width of a toner image at a predetermined value is obtained; and controlling said line width of said toner image according to said pulse width modulation value.

8. The line width controlling method of claim 7, wherein said forming step of forming said latent patch image includes the step of:

controlling said light emission of said light source according to index signals so as to form said latent patch image.

9. A line width controlling method for controlling a line width of a toner image, comprising the steps of:

adjusting pulse width signals for controlling light emission of a light source;

forming a latent patch image, comprised of a plurality of latent line images, each latent line image corresponding to one scanning line of said light emission at various intervals or at various reflection densities, on an image carrier by irradiating light from said light source;

developing said latent patch image with toner so as to form a toner patch image comprised of toner line images;

repeating said forming step of forming said latent patch image and said step of developing said latent patch image to form said toner patch image for a plurality of times, wherein said toner patch image at each time of forming has a different gradation from that at other times of forming, so that a series of toner patch images is formed on said image carrier;

measuring an optical density of said series of toner patch images so as to obtain a variation curve of said measured optical densities;

detecting an inflection point in said variation curve of said optical densities;

determining a pulse width modulation value for controlling light emission of said light source with which a line width of a toner image at a predetermined value is obtained; and repeating said steps of forming said series of toner patch images, measuring said optical densities of said series of toner patch images, and detecting said inflection point in said variation curve;

determining a linear speed value of a developing sleeve in a developing device with which a maximum density of said toner image at a predetermined value is obtained;

setting a linear speed of movement of said developing sleeve at said linear speed value; and controlling said line width of said toner image according to said pulse width modulation value.

10. The line width controlling method of claim 9, wherein said forming step of forming said latent patch image includes the step of:

controlling said light emission of said light source according to index signals so as to form said latent patch image.

* * * * *